J. J. WEST.

Gas-Stove.

No. 6,636. Reissued Sept. 7, 1875.

Witnesses:

C. H. Willett

H. T. Hunting.

Inventor:

John J. West

By Dudley & Warner

Attys

N. PETERS, PHOTO-LITHOGRAPHER, WASHINGTON, D. C.

UNITED STATES PATENT OFFICE.

JOHN J. WEST, OF CHICAGO, ILLINOIS.

IMPROVEMENT IN GAS-STOVES.

Specification forming part of Letters Patent No. 163,344, dated May 18, 1875; reissue No. 6,636, dated September 7, 1875; application filed June 14, 1875.

*To all whom it may concern:*

Be it known that I, JOHN J. WEST, of Chicago, in the county of Cook and State of Illinois, have invented certain new and useful Improvements in Gas-Stoves, of which improvements the following is a full, clear, and exact description, which will enable others skilled in the art to which my invention appertains to make and use the said improvements, reference being had to the accompanying drawing, forming a part hereof, and in which—

Figure 1:
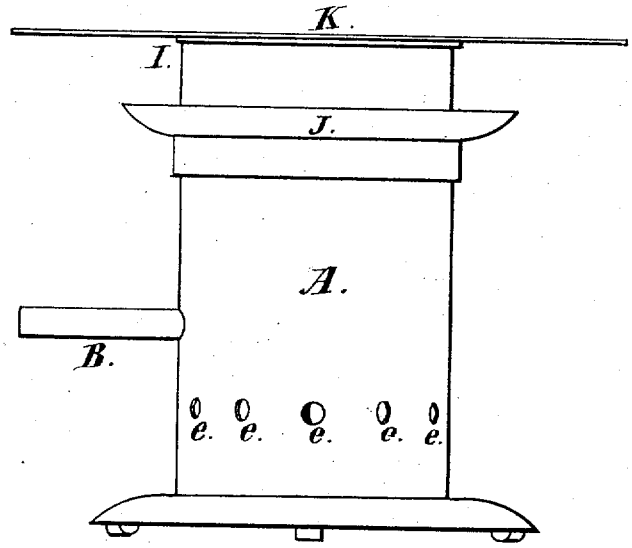
Figure 2:
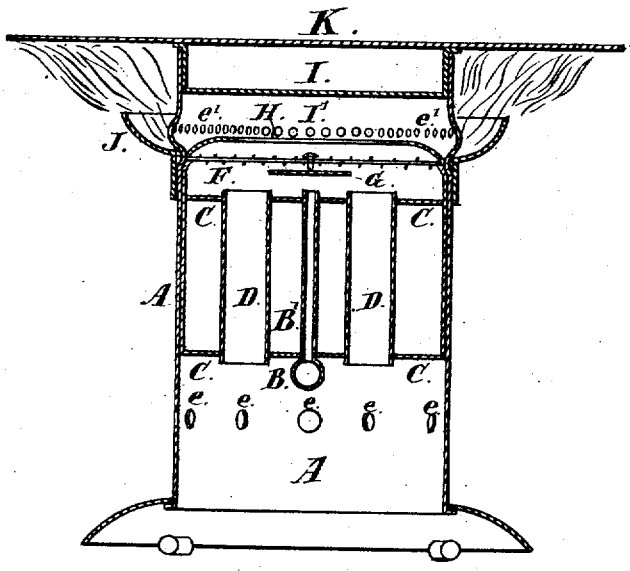

Figure 1 is a side elevation of my improved stove, and Fig. 2 a vertical central section thereof.

Like letters of reference indicate like parts.

In the drawing, A represents the outer wall or case of the stove. This part of the stove may either be open at the bottom, and supported in any suitable manner, or it may be perforated, as shown at *e e*, to admit the air, or these perforations may be employed in connection with an open bottom for the same purpose. B is a gas-pipe terminating in the vertical slender pipe or tube B′, arranged in the central part of the stove. C is a partition or diaphragm arranged across the upper part of the stove, as shown; and D D are vertical flues passing entirely through the said partition. The pipe B′ also passes through this partition, and terminates just above it. F is a diaphragm of wire-cloth arranged a little way above the flues D D and pipe B′. G is a diffuser arranged directly over the pipe B′. H is an annular flange projecting from the wall A inwardly, and arranged above the diaphragm F. *e′ e′* are openings in the wall A, and above the flange H; a continuous opening, however, may be employed instead of these perforations. I is a removable piece or cap resting on the upper edge of the wall A, and may project a considerable distance from it. J is a flange projecting outwardly from the wall A, and arranged just below the openings *e′ e′*. The upper face of this flange is preferably concave, as shown. K represents the article to be heated, which, instead of lying directly on the cap I, as shown, may be supported a little way above it. The wall of the stove extends sufficiently above the openings *e′ e′* to form a considerable chamber below the part I, as shown at I′, and also a considerable space between the parts J and K. The bottom of the cap I, however, may lie just above the ports *e′ e′*.

In order to use my stove, the part I is arranged as described, and the pipe B is connected to a gas-tip by means of a flexible tube. When the gas is turned on it passes out at the end of the tube B′, is spread in all directions by the diffuser G, passes through the diaphragm F, strikes the diaphragm H, and is deflected by it, enters the chamber I′, is again deflected by the part I, and passes out through the openings *e′ e′*, where it may be ignited. The flame, owing to the pressure of gas and air, and to the form and arrangement of the flange J, which protects it at this point from the influence of upward currents, will be carried to the outer edge of the said flange, where it forms a continuous sheet, and then extends upward, as represented in Fig. 2, thus making a very large flame in proportion to the size of the pipe B′. By this means the air within the stove is thoroughly mixed with the gas; and when the stove is thoroughly heated a current of air will enter the bottom, or be drawn in through the holes *e e*, pass upward through the flues D D, become highly heated and mixed with the gas, and pass out with it, thus causing the flame to be impinged with greater force upon the flange J than would result from the mere pressure of gas, and producing, to a considerable degree, the effect of a blow-pipe, besides producing a given degree of heat with a comparatively small amount of gas. The radiating-surface, as will be perceived, is large in proportion to the size of the stove, and the stove will be found to be exceedingly useful as a heater merely.

The stove will be operative if all the parts within it, except the gas-pipe, are omitted, and in the latter case the chamber I′ will constitute the whole of the interior of the stove. The flange J performs an important function independently of the parts within the stove; but, for the purpose of producing the most satisfactory results, I deem it best to employ some or all of the interior parts described, as may be considered most advantageous.

Having thus described my invention, what I claim as new, and desire to secure by Letters Patent, is—

1. The combination, in a gas-stove, of the external flame-protecting shield or flange J and the gas-ports $e'$ $e'$, substantially as and for the purposes specified.

2. The chamber I′, inclosed by the outer walls of the stove, and having therein the ports or openings $e'$ $e'$, in combination with the shield or flange J, projecting from the outer wall, and arranged somewhat below the said ports, substantially as shown and described, and for the purposes set forth.

3. The combination, in a gas-stove, of the outer wall A, the wire-cloth diaphragm F, the cap I, the gas-ports $e'$ $e'$, and the shield J, all substantially as and for the purposes specified.

4. The combination of the pipe B′, flues D D, annular flange H, and chamber I′, having therein the ports or openings $e'$ $e'$, all operating together in connection with a diffuser in a gas-stove, substantially as and for the purposes specified.

5. The combination of the pipes B′, flues D D, diffuser G, diaphragm F, flange H, openings $e'$ $e'$, and chamber I′, substantially as and for the purposes set forth.

JOHN J. WEST.

Witnesses:
F. H. HERRING,
F. F. WARNER.